(12) United States Patent
Landi

(10) Patent No.: US 7,464,886 B2
(45) Date of Patent: Dec. 16, 2008

(54) ELECTRICALLY OPERATED INJECTOR FOR GASEOUS FUEL

(75) Inventor: Stefano Landi, Reggio Emilia (IT)

(73) Assignee: MED S.p.A., Reggio Emilia (IT)

( * ) Notice: Subject to any disclaimer, the term of this patent is extended or adjusted under 35 U.S.C. 154(b) by 308 days.

(21) Appl. No.: 10/575,011

(22) PCT Filed: Apr. 7, 2004

(86) PCT No.: PCT/EP2004/003727

§ 371 (c)(1),
(2), (4) Date: Apr. 7, 2006

(87) PCT Pub. No.: WO2005/040591

PCT Pub. Date: May 6, 2005

(65) Prior Publication Data

US 2007/0040052 A1 Feb. 22, 2007

(30) Foreign Application Priority Data

Oct. 7, 2003 (IT) .......................... MI2003A1927

(51) Int. Cl.
*F02M 51/00* (2006.01)
(52) U.S. Cl. .............. 239/585.1; 239/533.2; 239/533.3; 239/533.9; 239/584; 239/585.3
(58) Field of Classification Search .............. 239/533.2, 239/533.3, 533.6, 533.9, 533.11, 533.15, 239/584, 585.1–585.5, 586; 251/129.16
See application file for complete search history.

(56) References Cited

U.S. PATENT DOCUMENTS

| | | | | |
|---|---|---|---|---|
| 3,422,850 A | * | 1/1969 | Caldwell | 137/625.65 |
| 4,156,506 A | | 5/1979 | Locke et al. | |
| 4,258,749 A | * | 3/1981 | Mayer | 137/596.17 |
| 4,365,747 A | * | 12/1982 | Knapp et al. | 239/125 |
| 4,909,447 A | * | 3/1990 | Gallup et al. | 239/585.3 |
| 5,381,966 A | * | 1/1995 | Gernert, II | 239/585.3 |

(Continued)

FOREIGN PATENT DOCUMENTS

EP 0 026 060 4/1981

(Continued)

OTHER PUBLICATIONS

Patent Abstracts of Japan, vol. 013, No. 593 (M-914), Dec. 27, 1989 & JP 01 249960 A (Japan Electron Control Syst Co Ltd), Oct. 5, 1989 abstract.

*Primary Examiner*—Len Tran
*Assistant Examiner*—Jason J Boeckmann
(74) *Attorney, Agent, or Firm*—Young & Thompson

(57) ABSTRACT

An electrically operated injector (1) for feeding a gaseous fuel to a cylinder of an internal combustion engine, in particular for a motor vehicle, includes an electromagnetic actuator (2) acting on a mechanical interceptor member (3) arranged to free or intercept a passage (4) for the fuel from a feed conduit (61) to a delivery conduit (5) connected to an outlet (6), between the delivery conduit (5) and the interceptor member (3) there being positioned a seal element (40). This latter is carried by the interceptor member (3) and has a shape tapering towards the delivery conduit (5) in order to effectively intercept the fuel gas passage (4) and minimize the area of impact with an annular end portion (43) of the delivery conduit (5).

15 Claims, 2 Drawing Sheets

U.S. PATENT DOCUMENTS

| | | | |
|---|---|---|---|
| 5,685,485 A | 11/1997 | Kappel et al. | |
| 5,924,674 A * | 7/1999 | Hahn et al. | 251/129.01 |
| 6,131,880 A * | 10/2000 | Hahn et al. | 251/129.16 |
| 6,311,901 B1 | 11/2001 | Hall et al. | |
| 6,364,282 B1 * | 4/2002 | Ausman et al. | 251/129.16 |
| 6,422,198 B1 | 7/2002 | Fournier et al. | |
| 2002/0030124 A1 | 3/2002 | Imoehl | |
| 2002/0074431 A1 | 6/2002 | Ren et al. | |

FOREIGN PATENT DOCUMENTS

| | | |
|---|---|---|
| EP | 0 491 404 | 6/1992 |
| EP | 1 114 929 | 7/2001 |
| EP | 1 231 378 | 8/2002 |
| EP | 1 375 903 | 1/2004 |
| EP | 1 398 497 | 3/2004 |
| GB | 2 178 483 | 2/1987 |
| WO | WO 88/04727 | 6/1988 |
| WO | WO 99/18345 | 4/1999 |

* cited by examiner

ELECTRICALLY OPERATED INJECTOR FOR GASEOUS FUEL

BACKGROUND OF THE INVENTION

1. Field of the Invention

The present invention relates to an electrically operated injector for feeding a gaseous fuel to a cylinder of an internal combustion engine.

2. Description of the Related Art

An electrically operated injector of the aforesaid type is known to comprise a body connected to a feed conduit for the gaseous fuel or simply gas (such as liquefied petroleum gas, or such as natural gas or hydrogen); this body contains an electromagnetic actuator (electromagnetic coil) acting on a mechanical member or armature movable about a passage which connects a chamber of said body, in communication with the gas feed conduit, to a delivery conduit connected to an outlet for feeding the gas into the corresponding cylinder either directly or indirectly via the intake manifold of the internal combustion engine. Under the influence of the magnetic force generated by the electromagnetic actuator, this mechanical member shuts off or frees said passage in order to prevent or alternatively enable gas to be fed into the cylinder. The generation of this force is controlled by controlling the electrical feed to the actuator by means of a command and control unit for the internal combustion engine operation. The mechanical member generally consists of a movable disc of ferromagnetic steel which closes the magnetic circuit generated by the actuator or coil. Said disc supports a pin for sliding in respect of the bobbin.

In addition, between the mechanical member and the conduit delivering the gas to the nozzle there is a seal element which enables the delivery conduit to be sealed when the mechanical member is in the position in which it intercepts the gas passage.

BRIEF SUMMARY OF THE INVENTION

An object of the present invention is to provide an electrically operated injector of reliable and safe use, in which the wear of those parts which move relative to each other, and in particular the mechanical member, the seal element and the delivery conduit, is minimized.

Another object is to provide an electrically operated injector in which turbulence generated within the injector by the passage of gas therethrough and hence the corresponding pressure drop are minimized in order to maximize the mass flow of gas from the injector.

A further object of the invention is to provide an electrically operated injector in which movement of the mechanical member by the electromagnetic actuator is assured.

These and further objects which will be apparent to the expert of the art are attained by an electrically operated injector in accordance with the accompanying claims.

BRIEF DESCRIPTION OF THE DRAWING FIGURES

The present invention will be better understood from the accompanying drawings, which are provided by way of non-limiting example and in which.

DETAILED DESCRIPTION OF THE PREFERRED EMBODIMENTS

Figure 1:
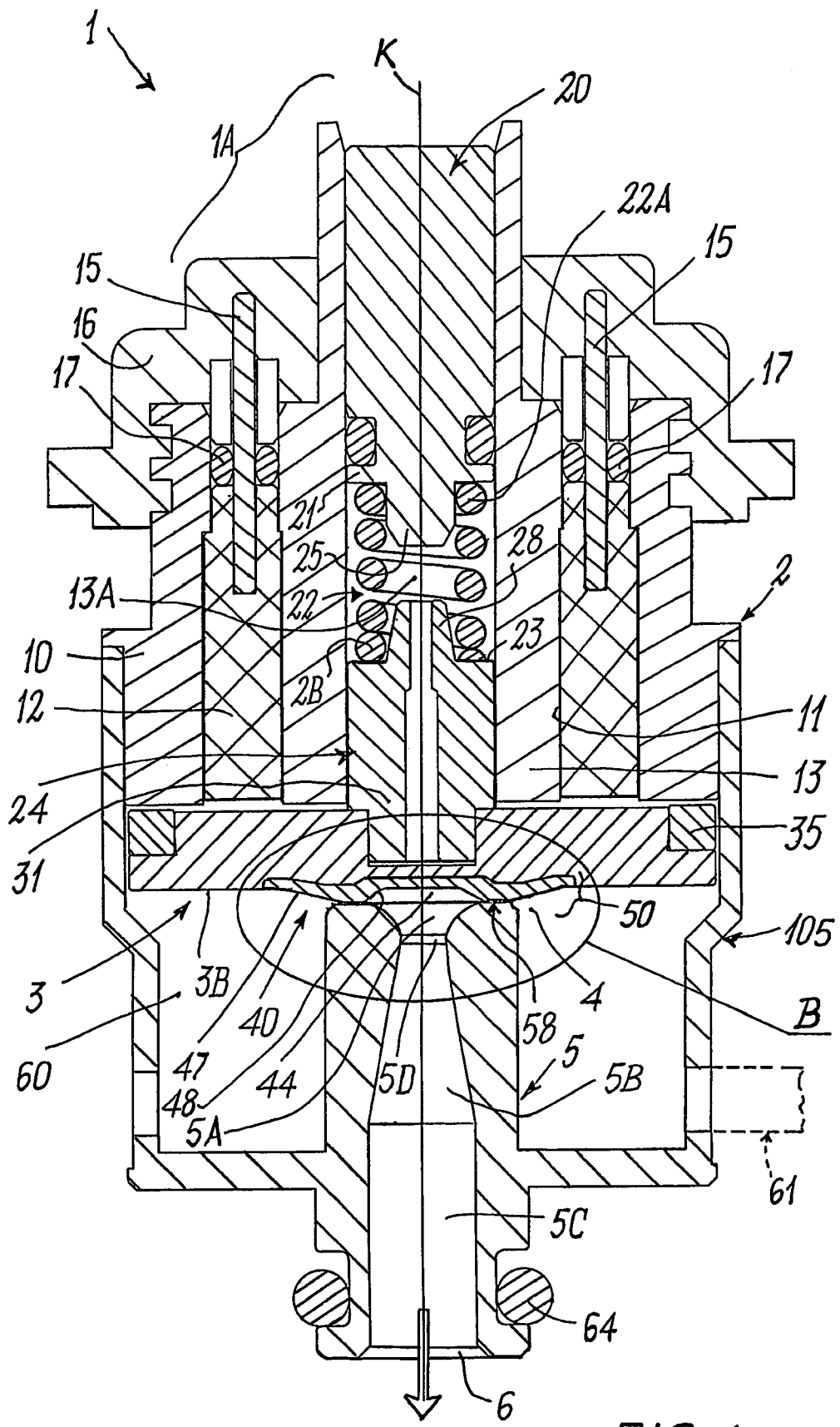
FIG. 1 is a cross-section through an electrically operated injector according to the invention.

With reference to said figures, an electrically operated injector according to the invention is indicated overall by 1 and comprises an electromagnetic actuator 2, a movable mechanical interceptor member 3 arranged to cooperate with a passage 4 for a gaseous fuel or gas directed to a conduit 5 for delivering the fuel gas to an outlet 6 cooperating with a corresponding cylinder of an internal combustion engine on which the invention is applied. More specifically, the electromagnetic actuator 2 consists of a ferromagnetic steel body 10, in a cavity 11 of which there is positioned an electrical winding 12 surrounding an internal hollow cylindrical part 13 of the body 10. The winding 12 cooperates with the blades 15 of a connector 16 positioned on an upper part 1A of the injector containing the body 10, seal elements 17 being present between the winding and the part 1A of the injector. The blades are electrically fed, in known manner and neither described nor shown, by the usual electrical circuit of the vehicle to which the said engine belongs.

The conduit 5 forms part of a portion 105 of injector 1, fixed to the body 10 for example by crimping.

In the inner cavity 13A of the cylindrical part 13 there is inserted at the top 1A of the injector a fixed setting element 20 cooperating at one end 21 with a spring 22 resting on an end 23 of a pin 24 (advantageously of wear resistant plastic) rigid with the interceptor member 3. The spring 22 has a first end 22A resting on the flat end 21 of the element 20 and is mounted about a central projecting part 25 thereof. The spring 22 presents a second end 22B resting on the end 23 (also flat) of the pin 24 and mounted about a central projecting part 28 of said end 23. Different positions of the element 20 in the cavity 13A result in different preloading of the spring 22 and hence different thrust actions of this spring on the pin 24 which, being rigid with the movable mechanical interceptor member 3, transfers said thrust to this latter to adjust its operating conditions. The stroke of the armature is set by virtue of the position of the conduit 5 or of the portion 105 of the injector 1 relative to the body 10, to which it is mechanically fixed.

As stated, the pin 24 is rigid with the interceptor member (or armature) 3 and has the known function of maintaining this latter to the greatest possible extent perpendicular to its direction of movement along the longitudinal axis K of the injector, in order to maximize the magnetic force generated by the actuator 2 and reduce those vibrations transverse to this movement which act on the spring 22, with the aim of increasing its life.

Figure 3:
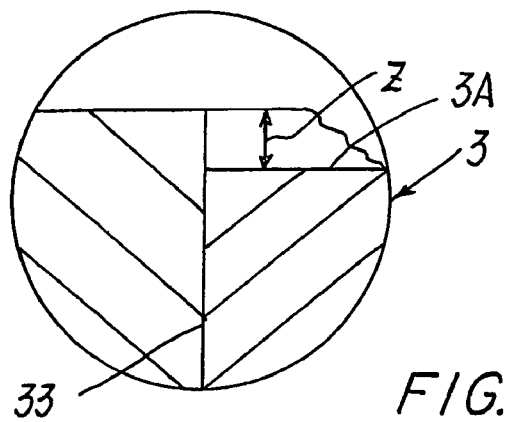
FIG. 3 is an enlarged view of the detail indicated by A in FIG. 2.
Figure 4:
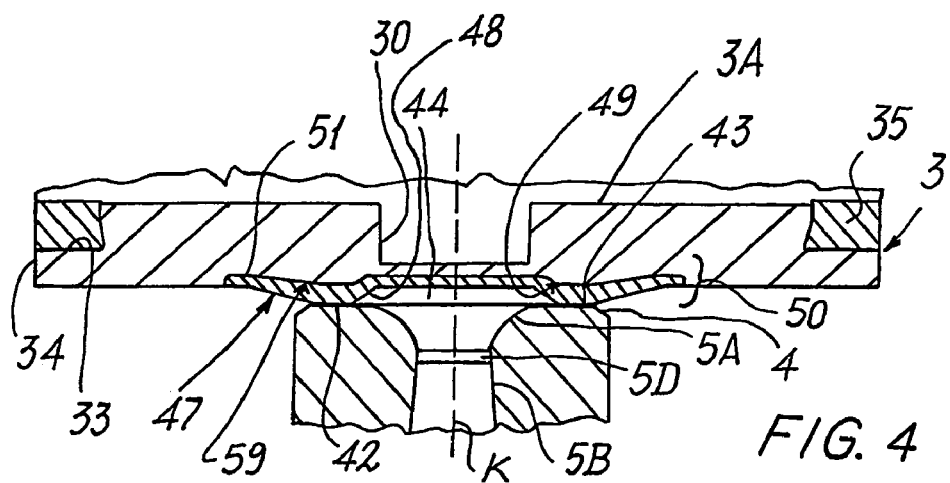
FIG. 4 is an enlarged view of the detail indicated by B in FIG. 1 with certain parts omitted for greater clarity.

The interceptor member 3 consists of a movable ferromagnetic steel disc which closes the magnetic circuit generated by the coil defining the electromagnetic actuator 2. This member 3 presents a central recess 30 provided within a first face 3A thereof which faces the actuator 2. The recess 30 receives an end part 31 of the pin 24, said part 31 being fixed in any known manner to said member. A part 35 projects by a distance Z (FIG. 3) from the face 3A of the member 3 in proximity to its lateral edge 34. Said projecting part 35 can be obtained, but not exclusively, by inserting into an annular recess 33, provided along a lateral edge 34 and on the face 3A of the member 3, an annular piece arranged to cooperate with the body 10 of the actuator 2 such as to maintain the member 3 detached from said body when said member is drawn towards this latter on using the injector 1. As an alternative, the projecting part 35 can be integral with the member 3. That surface of said part 35 facing the actuator 2 can be flat (as in the figures) or inclined to the edge 34 of the member 3.

More particularly, if the projecting part is defined by the annular piece 35, this latter is constructed preferably of plastic material so as not to interfere with the magnetic field generated between the actuator 2 and the member 3. Other materials having the same function can however be used to form the piece 35. The projecting part 35 is dimensioned such as to project from the recess 33 by a distance calculated to prevent contact between the interceptor member 3 and the body 10 and such that the closure time of said member onto the conduit 5 is the optimum for correct operation of the injector. By way of example, this distance (indicated by Z in FIG. 3) is between 0.07 and 0.13 mm and is preferably 0.1 mm. It is also dimensioned such as to ensure that the magnetic force, present during the "injector open" stage, is sufficient to overcome the forces that tend involuntarily to reclose the injector (by urging the member 3 onto the conduit 5 and closing the passage 4).

The part 35 also performs the function of absorbing the impact energy of the interceptor member 3 when magnetically drawn onto the body 10, so reducing wear of both said member 3 and said body 10.

On that face 3B facing the conduit 5 and distant from said face 3A there is rigidly attached a seal element 40 of elastomeric material, suitably shaped to prevent seepage of the fuel gas when the injector 1 is electrically deactivated and the passage 4 must be completely intercepted. The seal element 40 also aims to minimize wear of the surfaces of the member 3 and of the conduit 5 when the member moves, and to prevent any rebounding of this latter.

The seal element 40 is fixed to the member 3 in a seat 50 thereof preferably by co-moulding, before complete assembly of the injector 1.

More specifically, said element 40 has a shape tapering towards the conduit 5 which faces it and presents a free end 42 arranged to bearingly cooperate with a free end 43 of said conduit 5 when the passage 4 is intercepted. Preferably, the element 40 is frusto-conical and advantageously presents a dead recess 44 at its end 42 which in this manner assumes, when the injector is closed, an annular form bearing on the end 43 (also annular) of the conduit 5.

The internally hollow frusto-conical element 40 hence presents an outer wall 47 and an inner wall 48. These walls are preferably differently inclined to a straight line M perpendicular to the face 3B of the member 3 and parallel to the axis K, to achieve reduced wear of the element 40 because of its sliding on the end 43 of the conduit 5 when the member 3 intercepts the passage 4. For this reason the angle a between the wall 47 and the straight line towards the interior of the element 40 is between 65° and 80° and preferably equal to 72°; likewise the angle β between the wall 48 and said straight line M is between 35° and 55°, and advantageously equal to 47°. Also inclined at the same angle is an inner wall 49 of an annular projection 58 of the seat 50 provided in the face 3B of the member 3 and in which there rests a second end 51 of the seal element 40 rigid with the interceptor member 3. The seat 50 also acts as a support, together with the inner wall 49 of the projection 58, for the seal element 40 so reducing the deformation of this latter under the effect of the load which bears on the interceptor member 3 when the injector 1 is deactivated. In this manner the seal element 40 can effectively act as a limit stop for the movement of the member 3 towards the conduit 5.

The projection 58 present in the seat 50 presents an outer wall 59 inclined to the straight line M (or to the axis K) by an angle τ greater than that of said inner wall 49. The angle τ is, for example, between 70° and 90° and preferably equals 80°.

Figure 2:
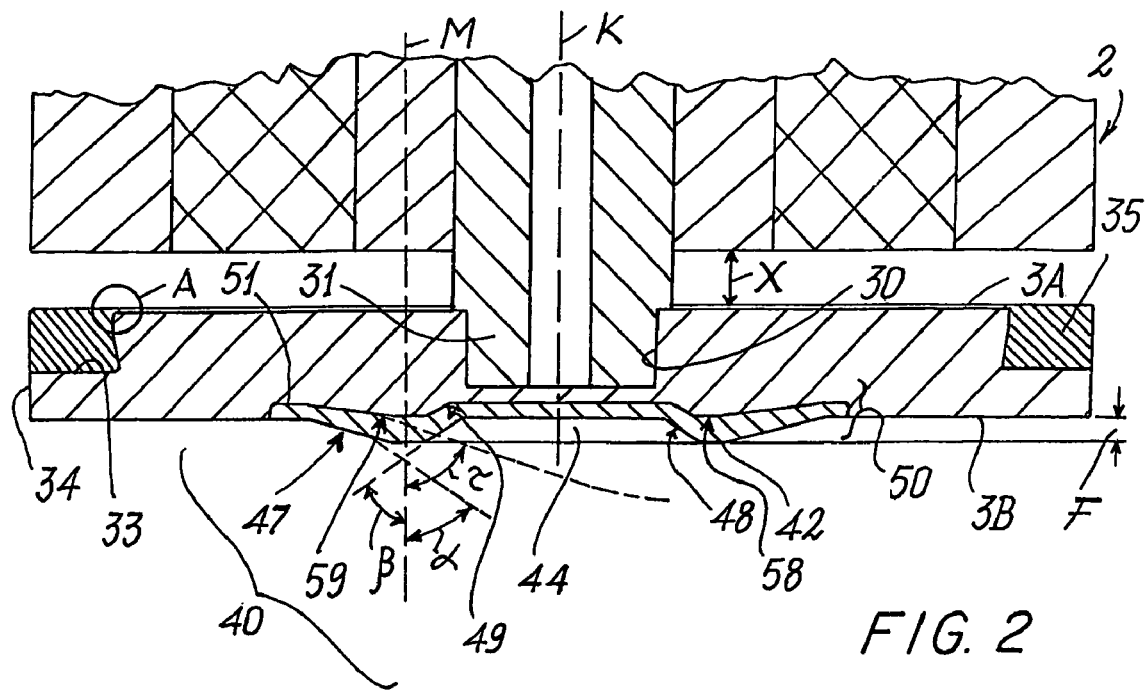
FIG. 2 is an enlarged view of a detail of the injector of FIG. 1.

The element 40 projects from the face 3B of the member 3 by a distance optimized to minimize the turbulence generated by the movement of the gas through the passage 4 and hence the pressure drop in order to maximize the mass flow of gas to the outlet 6. For example, this element could project by a distance (indicated by F in FIG. 2) between 0.6 and 1.0 mm, preferably 0.79 mm.

The outlet 6 is provided at the end of the conduit 5, which presents a first section 5A, close to the end 43 and tapering towards the axis K, a second section 5B which widens about this axis, and a third section 3C (terminating with the outlet 6) of constant cross-section. Between the sections 5A and 5B there is a short conduit portion, indicated by 5D, which acts as a sizing hole for the gas flow to the outlet. The sizing portion or hole 5D is dimensioned such as to ensure a constant gas flow rate independently of the value of the maximum stroke of the member 3 by the actuator 2 (indicated by X in FIG. 2), obviously within the tolerance range of this stroke.

Finally, the passage 4 cooperates with a chamber 60 present about the conduit 5 and connected to a fuel gas feed line or header 61 via an aperture 62 provided in the portion 105 of the injector 1. The purpose of the chamber 60 is to damp the acoustic effect generated by the impact of the member 3 against the actuator 2 during the opening of the injector. A seal element 64 is present between the conduit 5 and a known member for supplying gas to the cylinder of the engine (not shown) to which the invention is applied.

By virtue of the invention an electrically operated injector is obtained representing an improvement over known injectors. Other embodiments of the invention are possible while remaining within the scope of the following claims: for example the seal element 40 can also be of non-tapering cylindrical shape (right cylinder) or be associated with the face 3B of the member 3 in a manner different from that described.

This invention claimed is:

1. An electrically operated injector (1) for feeding a gaseous fuel to a cylinder of an internal combustion engine, comprising:

an electromagnetic actuator (2) configured to act on a discoidal mechanical interceptor member (3) arranged to free or intercept a passage (4) for said fuel from a feed conduit (61) to a delivery conduit (5) connected to an outlet (6); and a seal element (40) positioned between said delivery conduit (5) and said interceptor member (3), the seal element (40) being fixed to the interceptor member (3) and moving with the interceptor member (3), wherein the seal element (40) presents a recess (44) in an end (42) of the seal element (4) which cooperates with an end (43) of the delivery conduit (5) when the injector (1) is deactivated, said end (42) of the seal element (4) being annular, and the seal element (40) is of frusto-conical shape and rests with a tapered end (42) of the seal element (4) on the end (43) of the delivery conduit (5) when the injector is deactivated and the gas passage (4) is intercepted by the interceptor member (3), the seal element (40) being fixed in a seat (50) provided in a first face (3B) of the interceptor member (3) which faces the delivery conduit (5), the seal element 40 being made of elastomeric material, and the seat (50) for the seal element (40) contains a projection (58) on which said element rests and of which it substantially copies the shape, the projection (58) presenting an annular shape having an inner wall (49) and an outer wall (59), the inner wall (49) acting as a support for the seal element when urged into closure by the interceptor member (3) which intercepts the gas passage (4).

2. An electrically operated injector as claimed in claim 1, wherein the seal element (40) is co-moulded with the seat (50) of the interceptor member (3).

3. An electrically operated injector as claimed in claim 1, wherein a wall (48) of the recess (44) or an inner wall of the seal element (40) has an inclination different from that of an outer wall (47) of said seal element (40).

4. An electrically operated injector as claimed in claim 1, wherein the walls (49, 59) of the projection (58) have different inclinations to a common axis (M) which is perpendicular to the face (3A) of the interceptor member in which the seat (50) for the seal element is present.

5. An electrically operated injector as claimed in claim 1, wherein the seal element (40) projects from the first face (3B) of the interceptor member in which the seat (50) is provided.

6. An electrically operated injector as claimed in claim 1, wherein the interceptor member (3) presents, on a second face (3A) distant from the first face (3B) carrying the seal element, a projecting part (35) jutting from said second face (3A) and arranged to rest against the electromagnetic actuator (2) when the injector is open and the interceptor member (3) frees the gas passage (4), said member (3) being maintained at least partially detached from said actuator (1) when the injector is open.

7. An electrically operated injector as claimed in claim 6, wherein the projecting part (35) is annular.

8. An electrically operated injector as claimed in claim 7, wherein the projecting part (35) is separate from the interceptor member (3).

9. An electrically operated injector (1) for feeding a gaseous fuel to a cylinder of an internal combustion engine, comprising:
an electromagnetic actuator (2) configured to act on a discoidal mechanical interceptor member (3) arranged to free or intercept a passage (4) for said fuel from a feed conduit (61) to a delivery conduit (5) connected to an outlet (6); and
a seal element (40) positioned between said delivery conduit (5) and said interceptor member (3), the seal element (40) being fixed to the interceptor member (3) and moving with the interceptor member (3),
wherein the seal element (40) presents a recess (44) in a tapered end (42) of the seal element (4) which cooperates with an end (43) of the delivery conduit (5) when the injector (1) is deactivated, said tapered end (42) of the seal element (4) being annular, and the seal element (40) is of frusto-conical shape and rests with the tapered end (42) on the end (43) of the delivery conduit (5) when the injector is deactivated and the gas passage (4) is intercepted by the interceptor member (3), the seal element (40) being fixed in a seat (50) provided in a first face (3B) of the interceptor member (3) which faces the delivery conduit (5), the seal element 40 being made of elastomeric material,
wherein the interceptor member (3) presents, on a second face (3A) distant from the first face (3B) carrying the seal element, a projecting part (35) jutting from said second face (3A) and arranged to rest against the electromagnetic actuator (2) when the injector is open and the interceptor member (3) frees the gas passage (4), said member (3) being hence maintained at least partially detached from said actuator (1) when the injector is open,
and the second face (3A) of the interceptor member (3) presents a seat (30) for an end (31) of a pin (24) partially inserted into an inner cavity (13A) of a cylindrical part (13) of the electromagnetic actuator (2), said pin maintaining the interceptor member (3) perpendicular to its direction of movement relative to said actuator (2).

10. An electrically operated injector as claimed in claim 9, wherein said pin is of wear-resistant plastic.

11. An electrically operated injector (1) for feeding a gaseous fuel to a cylinder of an internal combustion engine, comprising:
an electromagnetic actuator (2) configured to act on a discoidal mechanical interceptor member (3) arranged to free or intercept a passage (4) for said fuel from a feed conduit (61) to a delivery conduit (5) connected to an outlet (6); and
a seal element (40) positioned between said delivery conduit (5) and said interceptor member (3), the seal element (40) being fixed to the interceptor member (3) and moving with the interceptor member (3),
wherein the seal element (40) presents a recess (44) in an end (42) of the seal element (4) which cooperates with an end (43) of the delivery conduit (5) when the injector (1) is deactivated, said end (42) of the seal element (4) being annular, and the seal element (40) is of frusto-conical shape and rests with its tapered end (42) on the end (43) of the delivery conduit (5) when the injector is deactivated and the gas passage (4) is intercepted by the interceptor member (3), the seal element (40) being fixed in a seat (50) provided in a first face (3B) of the interceptor member (3) which faces the delivery conduit (5), the seal element 40 being made of elastomeric material,
and the delivery conduit (5) comprises a plurality of portions (5A, 5B, 5C), two of which have variable cross-sections along their axis (K).

12. An electrically operated injector as claimed in claim 11, wherein a first portion (5A) of variable cross-section lies in proximity to the end (43) of the delivery conduit (5) which cooperates with the interceptor member and has a cross-section which converges towards the axis (K) when moving away from said end (43).

13. An electrically operated injector as claimed in claim 11, wherein the second portion (5B) of variable cross-section follows the first portion (5A) and diverges along the axis (K) when moving away from said first portion.

14. An electrically operated injector as claimed in claim 11, wherein a hole for sizing the gas flow directed to the outlet (6) is provided between said first portion (5A) and second portion (5B) of the delivery conduit (5).

15. An electrically operated injector as claimed in claim 11, wherein a delivery conduit third portion (5C) lies between the second portion (5B) and the outlet (6) and the delivery conduit third portion (5C) has a constant cross-section.

* * * * *